United States Patent

[11] 3,625,252

[72] Inventors Thomas W. Bermel
Corning, N.Y.;
Nicholas Lazar, Scranton, Pa.
[21] Appl. No. 723,387
[22] Filed Apr. 23, 1968
[45] Patented Dec. 7, 1971
[73] Assignee Corning Glass Works
Corning, N.Y.

[54] LINEARLY VARIABLE LINEAR FLUIDIC RESISTOR
18 Claims, 12 Drawing Figs.

[52] U.S. Cl. ................................................ 137/625.3, 137/625.31
[51] Int. Cl. .................................................. F16k 1/52
[50] Field of Search ...................................... 137/625.3, 625.31, 625.12, 625.15, 625.11; 251/208; 138/46

[56] References Cited
UNITED STATES PATENTS
| | | | |
|---|---|---|---|
| 1,015,164 | 1/1912 | Fowden | 137/625.12 X |
| 2,572,640 | 10/1951 | Lovegrove | 137/625.12 X |
| 2,912,011 | 11/1959 | Burg | 137/625.3 |
| 3,023,783 | 3/1962 | Vickery | 137/625.12 |

FOREIGN PATENTS
| | | | |
|---|---|---|---|
| 900,308 | 7/1962 | Great Britain | 137/625.15 |
| 20,913 | 1900 | Switzerland | 137/625.3 |
| 73,216 | 1948 | Norway | 137/625.3 |

Primary Examiner—Arnold Rosenthal
Attorneys—Clarence R. Patty, Jr., Walter S. Zebrowski and William J. Simmons, Jr.

ABSTRACT: A variable linear fluid resistor in which a variable number of restricted paths connect two chambers to which the terminal fittings are connected. In addition to providing linear pressure flow characteristics, a linear relationship between rotary resistance adjusting motion and resistance is obtained.

INVENTORS.
THOMAS W. BERMEL
NICHOLAS LAZAR
BY
ATTORNEY

INVENTORS.
THOMAS W. BERMEL
NICHOLAS LAZAR

BY William J. Simmons Jr.

ATTORNEY

LINEARLY VARIABLE LINEAR FLUIDIC RESISTOR

BACKGROUND OF THE INVENTION

I. Field of the Invention

The present invention finds general application in the field of fluidics and more specifically in the field of fluidic analog circuitry where linear elements are a necessity.

A fluidic resistor is a restriction which opposes fluid flow and which causes a pressure drop that is a function of the fluid flowing therethrough. When such a restriction exists in the form of an elongated, small diameter tube or capillary, the flow therethrough is laminar for ratios of length to diameter between prescribed limits. When the flow in such a tube is laminar, a substantially linear resistance is achieved, the magnitude thereof being approximated by the Hagen-Poiseuille law $$R = 128 \mu L / D^4$$

where:

$\mu$ 32 viscosity of the fluid (lb. f-sec./in.$^2$)
$L$ = length of resistor (in.)
$D$ = inside diameter of resistor (in.)

Because of the requirement that the length to diameter ratio (or the ratio of length to cross-sectional area in the case of a noncircular cross section) be maintained within prescribed limits, considerable difficulty has been encountered in developing variable linear resistors. An additional feature of this invention, the existence of a linear relationship between adjustment motion and resistance, has compounded development problems.

II. Description of the Prior Art

Prior attempts at providing variable fluidic resistors have included pinching flexible tubing to reduce the cross-sectional area thereof and varying the length of a resistor tube. The latter method may be implemented by a telescoping tube or an adjustable helical path which connects two reservoirs. Since these methods change the length to diameter ratio in order to change resistance, the resultant resistors are linear only throughout a narrow range of adjustment wherein the ratio of length to diameter satisfies the linearity requirement. Beyond this narrow range of adjustment, the resistance becomes nonlinear.

SUMMARY OF THE INVENTION

It is therefore an object of this invention to provide a variable fluidic resistor which exhibits a linear pressure flow relationship over a wide range of resistance.

Another object of this invention is to provide a variable fluidic resistor which exhibits a linear relationship between adjustment motion and flow therethrough.

A further object of this invention is to provide a variable linear fluidic resistor.

Briefly, the variable linear fluidic resistor of this invention comprises first and second fluid chambers having first and second external connections respectively connected thereto. A plurality of resistive paths are connected between the first and second chambers. Means are provided for inhibiting the flow of fluid through selected ones of the plurality of resistive paths.

Additional objects, features and advantages of the present invention will become apparent to those skilled in the art from the following detailed description and the attached drawing on which, by way of example, only the preferred embodiments of this invention are illustrated.

DETAILED DESCRIPTION

Figure 1:
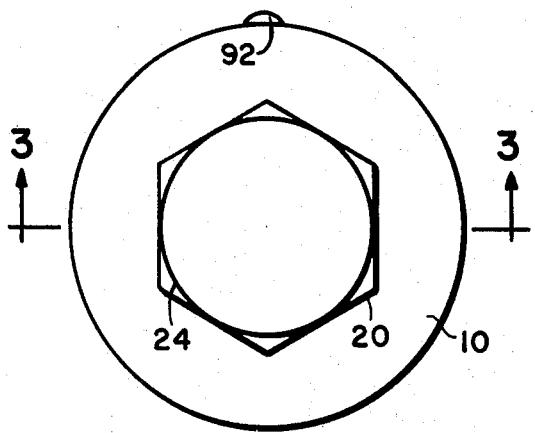
FIG. 1 is a top plan view of a preferred embodiment of a linearly variable linear resistor in accordance with the present invention.
Figure 2:
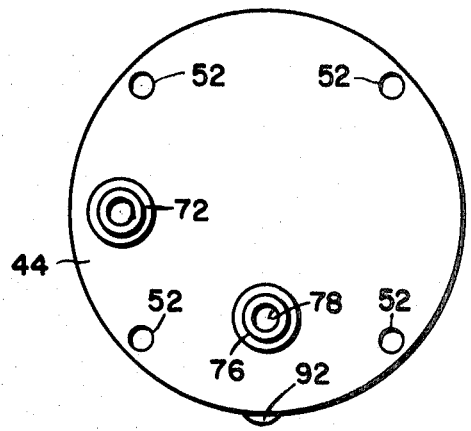
FIG. 2 is a bottom plan view of the preferred embodiment.
Figure 3:
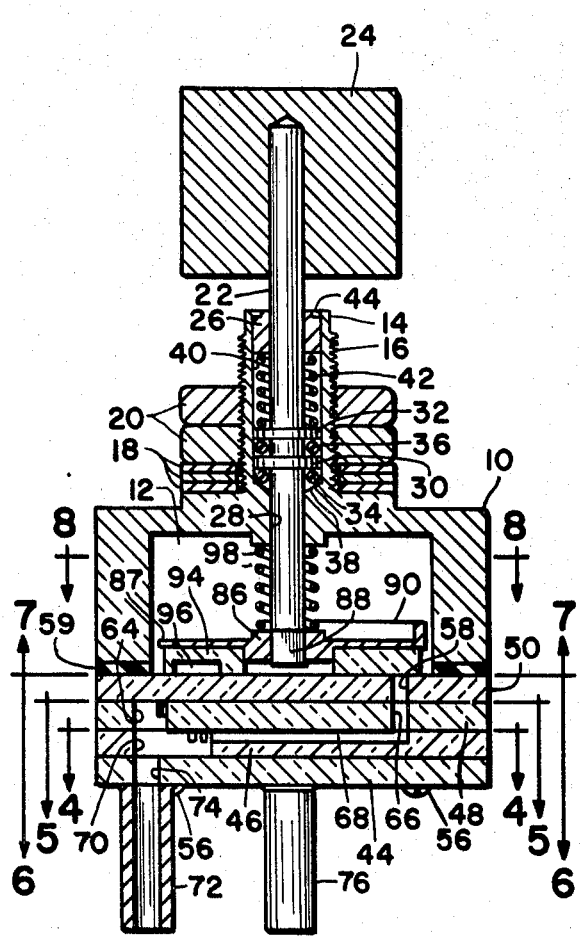
FIG. 3 is a cross-sectional elevational view taken at lines 3—3 of FIG. 1.
Figure 4:
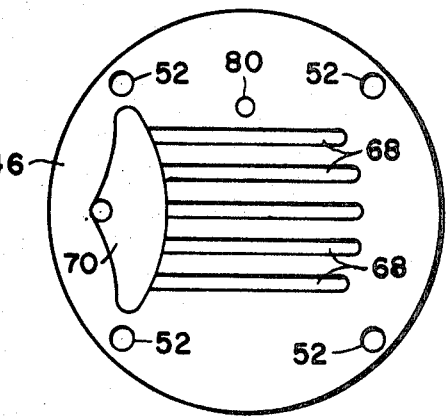
FIG. 4 is a cross-sectional view taken at lines 4—4 of FIG. 3.
Figure 5:
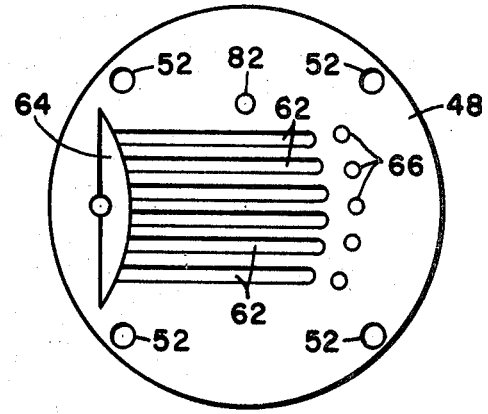
FIG. 5 is a cross-sectional view taken at lines 5—5 of FIG. 3.

Referring now to the drawings, there is shown in FIG. 3 a variable resistor comprising a main body member 10, the hollow interior portion of which forms a cavity 12. A narrow, upwardly extending portion 14 of the main body member 10 is externally threaded at 16. The threaded portion 16 is provided with a plurality of washers 18 and nuts 20 which are adapted to secure the variable fluidic resistor to a mounting panel.

A rotatable shaft 22 extends through the portion 14 and into the cavity 12. One end of the shaft 22 is provided with a knob 24 with which resistance adjustment can be made. Bearing surfaces for the shaft 22 are provided by a bore 28 in the member 10 and a brass bearing 26 which is situated in the end of the extended portion 14. The extended portion 14 contains a bore 40, one end of which is inwardly tapered to form an O-ring seat 38. The shaft 22 is provided with two flanged portions 30 and 32. A seal is effected between the shaft and the housing 10 by two O-rings 34 and 36, the O-ring 34 being disposed between the O-ring seat 38 and the flanged portion 30, and the O-ring 36 being disposed between the flanged portions 30 and 32. A spring 42 is disposed between the flanged portion 32 and the bearing 26, thereby compressing the O-ring 34 between the flanged portion 30 and the O-ring seat 38.

When assembling the heretofore described subassembly, the O-rings 34 and 36 are mounted in their indicated positions, and the spring 42 and the bearing 26 are inserted over the shaft. The bearing 26 is forced against the spring 42 until the bearing reaches the position shown in FIG. 3, and the end of the extended portion 14 is then crimped inwardly to retain the bearing 26.

In accordance with this invention a variable number of restricted paths or resistors are connected between two end chambers. The restricted path housing is shown in FIG. 3 to include four laminated plates 44, 46, 48 and 50 which are etched, machined or otherwise provided with passages or channels which will be hereinafter described. The plates 44, 46, 48 and 50 are shown in FIGS. 2, 4, 5 and 6, respectively, to contain four holes 52 which are equally spaced around the periphery thereof and which are aligned with four internally threaded holes 54 in the main body member 10. Four screws 56 pass through the holes 52 and engage the threaded holes 54 to secure the plates 44, 46, 48 and 50 to the member 10. A gasket 59 which is interposed between the plate 50 and the member 10 provides a fluidtight seal therebetween. It may be desirable to adhere adjacent plates to each other to a greater extent than that provided by tightening the screws 56. This may be accomplished by fusing, gluing or otherwise securing adjacent plates to each other.

Figure 6:
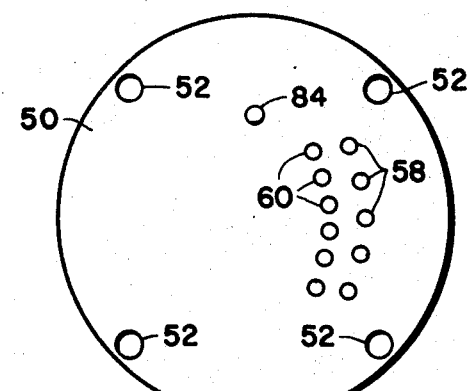
FIG. 6 is a cross-sectional view taken at lines 6—6 of FIG. 3.
Figure 7:
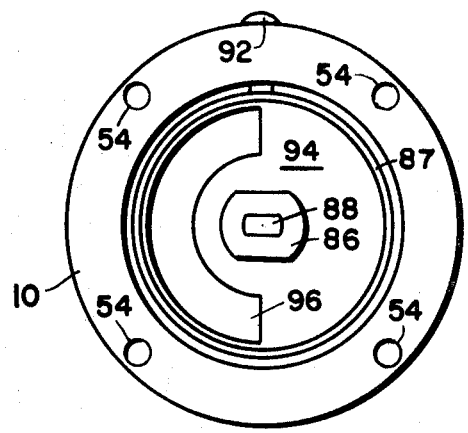
FIG. 7 is a cross-sectional view taken at lines 7—7 of FIG. 3.
Figure 8:
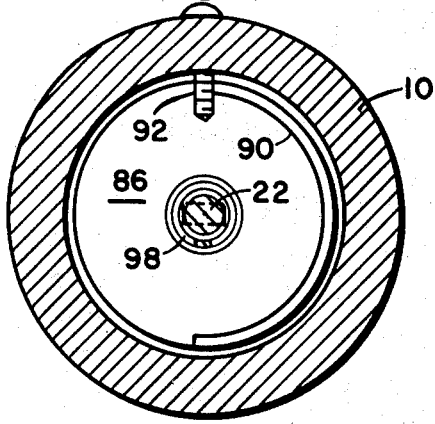
FIG. 8 is a cross-sectional view taken at lines 8—8 of FIG. 3.

As shown in FIG. 6 the plate 50 contains two rows of holes 58 and 60 which extend entirely therethrough, each row being situated on a circular path. Each of the holes 60 communicates with a corresponding channel 62 in the surface of the plate 48 (see FIG. 5). The remaining ends of the channels 62 communicate with a chamber 64. Each of the holes 58 in the plate 50 is aligned with a corresponding hole 66 which extends entirely through the plate 48 and communicates with a corresponding channel 68 in the surface of the plate 46 (see FIG. 4). The remaining ends of the channels 68 communicate with a chamber 70. An external connection fitting 72 is aligned with a hole 74 which extends through the plate 44 and communicates with the chambers 64 and 70. Another external connection fitting 76 communicates with the holes 78, 80, 82 and 84 which extend through the plates 44, 46, 48 and 50, respectively.

A disk 87 having a rectangular hole therethrough is mounted on the end portion 88 of the shaft 22 which has a rectangular cross section. The disk 87 has an enlarged hub 86. A flange 90 extends 180° around the circumference of the disk 87. A screw 92, which extends through the sidewall of the main body member 10, is adapted to engage the sides of the flange 90 and thereby limit the rotation of the disk 87 is slightly less than 180°. The flange 90 may extend more or less than the illustrated amount depending on the desired amount of shaft rotation. Situated adjacent the disk 87 is a circular plate 94 having a noncircular hole therethrough into which extends a correspondingly shaped protrusion of the hub 86. An annularly shaped slot 96 extends 180° around the surface of the plate 94 adjacent the plate 50. The mating surfaces of the plates 50 and 94 are polished to provide a substantially fluid-tight interface. A spring 98 which surrounds a portion of the shaft 22 bears against the disk 87 to cause the plate 94 to bear tightly against the plate 50.

The operation of the disclosed embodiment will now be described, reference being made to the schematic illustration of FIG. 9. As stated hereinabove, the present invention basically consists of two end chambers which are connected by a variable number of linear resistor channels. In FIG. 3, one of these end chambers is shown to consist of the combination of the chambers 64 and 70, the other end chamber consisting of the slot 96 in the circular plate 94. The external connection fittings 72 and 76 respectively communicate with these two end chambers. A first series of resistive paths which may connect the two end chambers consists of the channels 68, the holes 66 and the holes 58. A second series of resistive paths which may connect these end chambers consists of the channels 62 and the holes 60. All of the above-defined resistive paths are equal in length, and each path provides a predetermined linear resistance. The cross-sectional area of the holes 58, 60 and 66 is greater than that of the resistive channels 62 and 68, the holes therefore contributing only a negligible amount of resistance.

Figure 9:
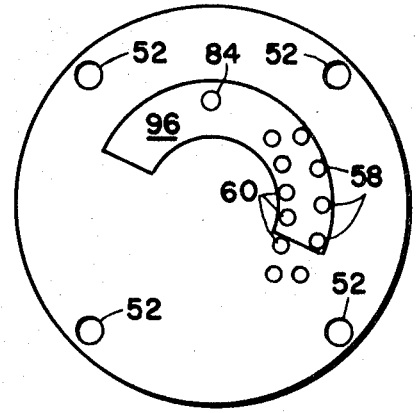
FIG. 9 is a schematic representation which illustrates the operation of the preferred embodiment.

FIG. 9 illustrates how any number of resistive paths may be selected to connect the slot 94 with the chambers 64 and 70. When the shaft 22 is rotated between its maximum limits of rotation, the slot 96 is in constant communication with the hole 84. The position of the slot 96 as illustrated in FIG. 9 connects eight resistive paths in parallel. As the shaft is rotated and the slot moves to a new position, the holes 58 and 60 are alternately cut by the end of the slot. The primary purpose for providing a plurality of rows of holes is to permit the end of the slot to cut through one hole at the time, two holes never being simultaneously partially open there must always be a space between adjacent holes in each row to provide mechanical strength. If only one row of holes were used, the inter hole spacing would cause a dead spot in the rotation of the plate 94 during which time there would be no change in resistance. The provision of a plurality of rows of holes permits the slot 96 to cut one hole in one row and then immediately cut one hole in another row, no dead spots being encountered between these two holes.

The plates 44, 46, 48, 50 and 94 may be formed of any suitable material such as metal, glass, ceramic, plastic, or the like, and may be secured, sealed or bonded together by any suitable method well known to one familiar with the art, such as fusion of the plates, securing the plates with screws, and the like. The plates may be machined, etched or otherwise grooved to provide the openings, holes and channels through which the fluid passes. This invention is not limited to any particular fluid and may be used in systems employing such compressible fluids as air, nitrogen or other gases, or incompressible fluids as water or other liquids.

The main body member 10 may be constructed from any suitable material such as plastic, ceramic, metal or the like, which provides adequate strength in the thin-walled extended portion 14. The disk 87 is preferably constructed from metal since high stresses are incurred when the flanged portion 90 contacts the limit screw 92.

One variable resistor constructed in accordance with the present invention contained three circular rows of holes in the top plate 50. One of the rows contained 11 holes, and the other two contained 10 holes each. A 93° rotation of the shaft 22 was required to vary the resistance from zero to a maximum value. Therefore, each 3° of rotation permitted the slot 96 to communicate with one additional hole. It is obvious that since there were three rows of holes in the top plate, three plates having resistor channels therein were required rather than the two plates shown in the preferred embodiment.

Figure 10:
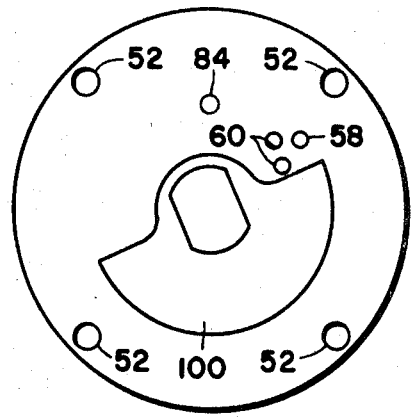
FIG. 10 illustrates an alternative embodiment of this invention.

The circular plate 94 could be replaced by a semicircular disk 100 which is shown in FIG. 10. Such a disk covers all of the holes 58 and 60 except those which are to be used as resistive paths. When the disk 100 is used, the cavity 12 takes the place of the slot 96. Thus, fluid issuing from the hole 84 would enter the cavity 12 and thereafter flow into the exposed ones of the holes 58 and 60. Since this alternative embodiment has an increased capacitance due to the size of the cavity 12, the slotted plate 94 is preferred over the disk 100 in systems wherein such capacitance is undesirable.

Figure 11:
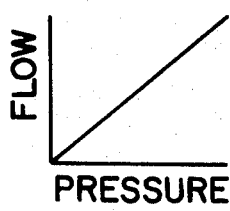
FIG. 11 is a pressure flow diagram for the preferred embodiment.

FIGS. 10 and 11 are graphs which illustrate the performance of the linearly variable linear resistor of this invention. For every value of resistance to which this resistor may be adjusted, the pressure flow characteristics are linear as illustrated in FIG. 11 since each of the resistive paths consists of a linear resistor.

Figure 12:
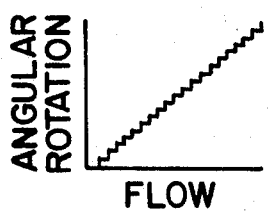
FIG. 12 is a graph which illustrates the relationship between flow and angular rotation of the adjusting knob for the preferred embodiment.

As illustrated in FIG. 12 the relationship between flow and angular rotation of the shaft 22 is also substantially linear. Each increment of angular adjustment adds or subtracts an equal increment of resistance, thereby causing a minute step increase or decrease in the flow through the resistor.

A nonlinear relationship between angular rotation and flow may be achieved by providing nonequal resistive paths of different lengths or cross-sectional areas.

This invention is not limited to the circularly arranged holes described in the preferred embodiment. The holes could lie on a curve such as a spiral, a straight line or the like so long as the means which inhibits fluid flow through the holes is provided with the proper motion. Furthermore, the holes do not necessarily connect to resistive paths which are perpendicular thereto. Rather, the holes could themselves be resistive paths which linearly extend between the two end chambers.

We claim:
1. A variable linear fluidic resistor comprising
   first and second chambers,
   first and second fluid coupling means respectively connected to said first and second chambers,
   a plurality of linear resistive paths connected between said first and second chambers, the length and the cross-sectional area of each linear resistive path being such that the flow of fluid therethrough is substantially laminar and the ratio of the fluid flow through said linear resistive paths to the pressure differential thereacross is substantially constant, and
   means for inhibiting the flow of fluid through selected ones of said plurality of resistive paths.
2. A variable linear fluidic resistor in accordance with claim 1 wherein said resistive paths are connected to a first surface which defines one wall of said first chamber.
3. A variable linear fluidic resistor in accordance with claim 2 which further comprises a movable member having a slot therein, the sidewalls of said slot communicating with said first surface to provide a fluidtight seal, said slot and the portion of said first surface intercepted by said slot forming said first chamber.
4. A variable linear fluidic resistor in accordance with claim 3 wherein said movable member is rotatable.
5. A variable linear fluidic resistor in accordance with claim 3 wherein said first fluid coupling means communicates with a hole which terminates on said first surface within said first chamber.

6. A variable linear fluidic resistor in accordance with claim 5 wherein said slot is annularly shaped and said resistive path terminations are located on a circular path.

7. A variable linear fluidic resistor in accordance with claim 6 wherein said first surface is one of the surfaces of a first flat plate, said resistor further comprising at least one resistor plate adjacent the surface of said first flat plate which is opposite said first chamber, the surface of each said resistor plate having a plurality of channels therein, and a plurality of holes in said first plate communicating with one end of each of said channels, the remaining ends of said channels terminating at said second chamber.

8. A variable linear fluidic resistor in accordance with claim 2 wherein said inhibiting means comprises a flat movable member which is situated within said first cavity on said first surface and which is adapted to cover any number of resistive terminations.

9. A variable linear fluidic resistor in accordance with claim 8 wherein said flat movable member is a rotatable semicircular disk and said resistive terminations lie on a circular path.

10. A variable linear fluidic resistor comprising
a first flat plate having first and second surfaces,
first means disposed adjacent the first surface of said first plate to form a first chamber,
at least one resistor plate disposed adjacent to the second surface of said flat plate, each said resistor plate having a plurality of channels in one surface thereof, each of said channels providing a linear resistance to the flow of fluid therethrough,
a plurality of holes connecting a first end of each of said channels to the first surface of said flat plate, the resistance of said holes to the flow of fluid being negligible in comparison to the resistance of said plurality of channels,
a second chamber, the second ends of each of said channels terminating at said second chamber,
first and second external connectors respectively connected to first and second chambers, and
means for inhibiting the flow of fluid through selected ones of said plurality of channels.

11. A variable linear fluidic resistor in accordance with claim 10 wherein
said means for inhibiting comprises a movable member having first and second surfaces, the first surface of said movable member disposed adjacent the first surface of said flat plate,
a slot in the first surface of said movable member, said slot being adapted to engage any number said plurality of holes in the first surface of said flat plate,
said slot and the portion of the first surface of said flat plate which is intercepted by said slot forming said first chamber, and
a main hole through said flat plate which terminates on the first surface thereof within said first chamber, said first external connector communicating with said main hole.

12. A variable linear fluidic resistor in accordance with claim 11 which further includes means to rotate said movable member.

13. A variable linear fluidic resistor in accordance with claim 12 which further includes means to force the first surface of said movable member against the first surface of said flat plate to form a substantially fluidtight interface therebetween.

14. A variable linear fluidic resistor in accordance with claim 13 which further includes means to limit the extent of rotation of said movable member.

15. A variable linear fluidic resistor comprising
a first flat plate having first and second surfaces,
a hollow member disposed adjacent the first surface of said first plate, a substantially fluidtight cavity being formed by said hollow member and said first plate,
a bore through said hollow member opposite said first plate,
a shaft extending through said bore,
means for providing a substantially fluidtight seal between said shaft and said hollow member,
at least one resistor plate disposed adjacent to the second surface of said flat plate, each said resistor plate having a plurality of channels in one surface thereof,
a plurality of holes connecting a first end of each of said channels to the first surface of said first plate,
a first chamber, the second ends of each of said channels terminating at said first chamber,
a first external connector communicating with said first chamber,
a movable plate having first and second surfaces, the first surface of said movable plate disposed adjacent the first surface of said first plate,
a slot in the first surface of said movable plate, said slot being adapted to engage any number of said plurality of holes in the first surface of said first plate, said slot and the portion of the first surface of said first plate which is intercepted by said slot forming a substantially fluidtight chamber,
a main hole through said flat plate which terminates on the first surface thereof within said fluidtight chamber,
a second external connector communicating with said main hole, and
means for connecting the end of said shaft which extends into said cavity to said movable plate.

16. A variable linear fluidic resistor in accordance with claim 15 which further includes means to limit the extent of rotation of said movable member.

17. A variable linear fluidic resistor in accordance with claim 16 which further includes means to force the first surface of said movable plate against the first surface of said first plate.

18. A variable linear fluidic resistor in accordance with claim 1 wherein the cross-sectional area of said linear resistive paths is substantially constant throughout the lengths thereof.

* * * * *